US012676694B2

(12) United States Patent
Li et al.

(10) Patent No.: US 12,676,694 B2
(45) Date of Patent: Jul. 7, 2026

(54) INTERFERENCE SIGNAL SENDING METHOD AND APPARATUS, ELECTRONIC DEVICE, AND COMPUTER-READABLE STORAGE MEDIUM

(71) Applicant: ZTE CORPORATION, Shenzhen (CN)

(72) Inventors: Bin Li, Shenzhen (CN); Weiwei Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 311 days.

(21) Appl. No.: 18/562,877

(22) PCT Filed: Apr. 6, 2022

(86) PCT No.: PCT/CN2022/085267
§ 371 (c)(1),
(2) Date: Nov. 21, 2023

(87) PCT Pub. No.: WO2022/242345
PCT Pub. Date: Nov. 24, 2022

(65) Prior Publication Data

US 2024/0267148 A1 Aug. 8, 2024

(30) Foreign Application Priority Data

May 21, 2021 (CN) ......................... 202110562099.4

(51) Int. Cl.
*H04K 3/00* (2006.01)

(52) U.S. Cl.
CPC ................. *H04K 3/43* (2013.01); *H04K 3/41* (2013.01); *H04K 3/42* (2013.01); *H04K 3/84* (2013.01)

(58) Field of Classification Search
CPC .. H04K 3/43; H04K 3/41; H04K 3/42; H04K 3/84
See application file for complete search history.

(56) References Cited

U.S. PATENT DOCUMENTS 6,195,529 B1 * 2/2001 Linz ......................... H04K 3/42 342/14
6,393,254 B1 5/2002 Pousada Carballo
(Continued)

FOREIGN PATENT DOCUMENTS

CN 101341770 A 1/2009
CN 101502197 A 8/2009

OTHER PUBLICATIONS

European Patent Office, the Extended European Search Report dated Jan. 17, 2025, for corresponding EP application No. 22803670.3.

(Continued)

*Primary Examiner* — John J Lee
(74) *Attorney, Agent, or Firm* — Li & Cai Intellectual Property (USA) Office

(57) ABSTRACT

The present application provides a method for sending an interference signal, an apparatus for sending an interference signal, an electronic device, and a computer-readable storage medium, the method for sending the interference signal includes: acquiring a power intensity, to be received, of a target signal correctly demodulated in a wireless communication system, the target signal being a signal to be demodulated by a terminal to access the wireless communication system; determining a parameter for sending the interference signal according to the power intensity, to be received, of the target signal correctly demodulated; and sending the interference signal based on the parameter for sending the (Continued)

interference signal, so that the terminal in a target area is unable to correctly demodulate the target signal.

12 Claims, 4 Drawing Sheets

(56) References Cited

U.S. PATENT DOCUMENTS

| | | | | |
|---|---|---|---|---|
| 2004/0242149 | A1 | 12/2004 | Luneau | |
| 2010/0289688 | A1* | 11/2010 | Sherman | H04K 3/28 342/16 |
| 2010/0311403 | A1* | 12/2010 | McNally | H04W 48/02 455/419 |

OTHER PUBLICATIONS

WIPO, International Search Report issued on Jun. 16, 2022.

* cited by examiner

INTERFERENCE SIGNAL SENDING METHOD AND APPARATUS, ELECTRONIC DEVICE, AND COMPUTER-READABLE STORAGE MEDIUM

CROSS-REFERENCE TO RELATED APPLICATIONS

The present application is a National Phase Application filed under 35 U.S.C. 371 as a national stage of PCT/CN2022/085267 filed on Apr. 6, 2022, and claims the priority of Chinese Patent Application No. 202110562099.4, filed on May 21, 2021, the contents of which are incorporated herein in their entirety by reference.

TECHNICAL FIELD

The present disclosure relates to the field of communication technologies, and in particular, to a method for sending an interference signal, an apparatus for sending an interference signal, an electronic device, and a computer-readable storage medium.

BACKGROUND

Wireless communication technologies are rapidly developing, base stations of wireless communication systems are increasingly deployed, and as applications of 5G wireless communication systems or the like, the use of more frequency band resources and massive multiple input multiple output (Massive MIMO) technologies results in the coverage area of wireless signals larger and larger, so that, a terminal can access a ground wireless communication system even in certain scenes (such as in a cabin of an aircraft) where the terminal originally cannot access the ground wireless communication system. In some scenes, the terminal accessing the ground wireless communication system may cause serious consequences or form great hidden safety hazards, for example, the aircraft is close to the ground when taking off and landing, and if a terminal of a passenger in the cabin of the aircraft is not normally turned off, the terminal of the passenger may access the ground wireless communication system. Since the relevant wireless communication protocols have relatively low expectations on RF indexes of terminals of passengers, the performance of power amplifiers and/or filters of some terminals may be poor, which may result in strong spurious signals in certain frequency bands, moreover, even the wireless communication protocols have relatively high expectations on spurious signals of the terminals, the spurious signals may only be limited below −50 dBm/MHz, which may also interfere normal operations of an airborne device, such as an altimeter, in the aircraft, so that an alarm event of the airborne device may occur, and a great hidden danger is formed on the aviation safety.

SUMMARY

In a first aspect, the present application provides a method for sending an interference signal, including: acquiring a power intensity, to be received, of a target signal correctly demodulated in a wireless communication system, the target signal being a signal to be demodulated by a terminal to access the wireless communication system; determining a parameter for sending the interference signal according to the power intensity, to be received, of the target signal correctly demodulated; and sending the interference signal based on the parameter for sending the interference signal, so that the terminal in a target area is unable to correctly demodulate the target signal.

In a second aspect, the present application provides an apparatus for sending an interference signal, including: an acquisition module configured to acquire a power intensity, to be received, of a target signal correctly demodulated in a wireless communication system, the target signal being a signal to be demodulated by a terminal to access the wireless communication system: a determination module configured to determine a parameter for sending the interference signal according to the power intensity, to be received, of the target signal correctly demodulated; and a sending module configured to send the interference signal based on the parameter for sending the interference signal, so that the terminal in a target area is unable to correctly demodulate the target signal.

In a third aspect, the present application provides an electronic device, including: at least one processor; and a memory having at least one computer program stored thereon, the at least one computer program, executed by the at least one processor, causes the at least one processor to implement the method for sending the interference signal described above.

In a fourth aspect, the present application provides a computer-readable storage medium having a computer program stored thereon, the computer program, executed by a processor, causes the processor to implement the method for sending the interference signal described above.

DETAILED DESCRIPTIONS

In order to make those skilled in the art better understand the technical solutions of the present application, a method for sending an interference signal, an apparatus for sending an interference signal, an electronic device, and a computer-readable storage medium provided in the present application are described in detail below with reference to the accompanying drawings.

Exemplary implementations are described in detail below with reference to the accompanying drawings, but may be embodied in different forms, and should not be construed as limited to the embodiments set forth herein. The implementations are illustrated to make the present application more thorough and complete, and for those skilled in the art more fully understanding the scope of the present application.

The implementations of the present application and the technical features in the implementations may be combined with each other if no conflict is incurred.

As used herein, a term "and/or" includes any and all combinations of at least one of listed items.

The terms used in the present application are for a purpose of describing particular embodiments only, and are not intended to limit the present application. As used in the present application, singular forms "a" and "the" are intended to include plural forms as well, i.e., to represent at least one, unless the context clearly defines otherwise. It should further be understood that terms "includes/comprises" and/or "made of/consisted of" in the present application are used to specify a presence of at least one of recited features, integers, steps, operations, elements or components, but do not preclude a presence or an addition of at least one of other features, integers, steps, operations, elements, components or groups thereof.

Unless otherwise defined, meanings of all terms (including technical terms and scientific terms) used herein are the same as the meanings commonly understood by one of ordinary skill in the art. It should further be understood that terms, such as those defined in common dictionaries, should be construed as having a meaning that is consistent with that in background of the existing art and the present application, and should not be construed as having an idealized or over-formal meaning, unless expressly defined in the present application.

Figure 1:
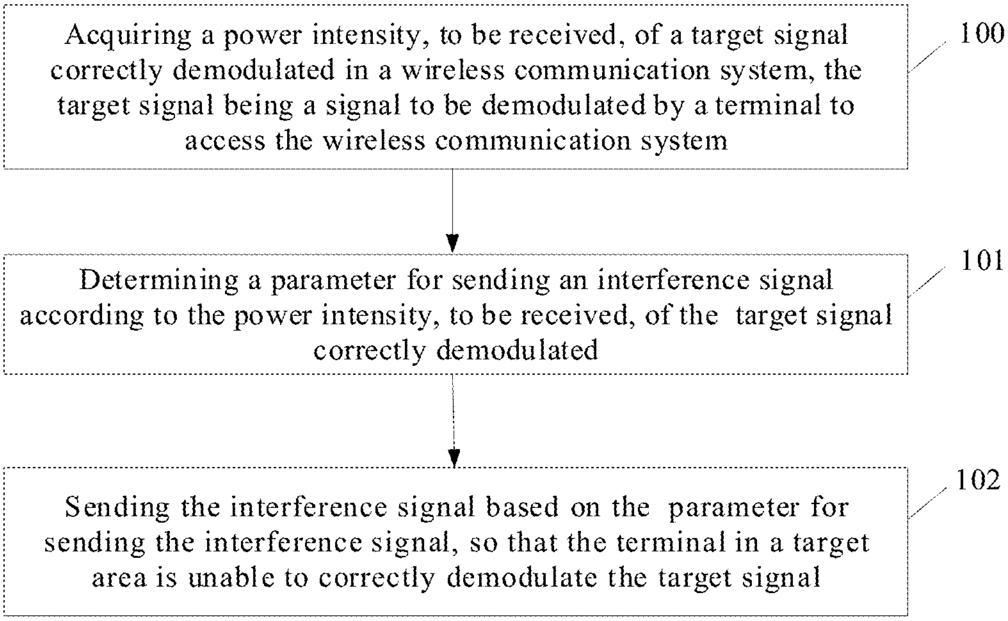
FIG. 1 is a flowchart of a method for sending an interference signal in the present application.

FIG. 1 is a flowchart of a method for sending an interference signal in the present application.

In a first aspect, referring to FIG. 1, the present application provides a method for sending an interference signal, including following operations 100 to 102.

At operation 100, acquiring a power intensity, to be received, of a target signal correctly demodulated in a wireless communication system, the target signal being a signal to be demodulated by a terminal to access the wireless communication system.

In the present application, for a scene where a target area is in a cabin of an aircraft, the terminal refers to a terminal device carried by a passenger or a crew member in the aircraft, and does not include an airborne device in the aircraft.

In some implementations, the acquiring a power intensity, to be received, of a target signal correctly demodulated in a wireless communication system includes: calculating a correlation between a wireless signal received within a target frequency band and a downlink synchronization signal of the wireless communication system:

determining time synchronization information and frequency synchronization information according to the wireless signal with the maximum correlation: demodulating the target signal according to the time synchronization information and the frequency synchronization information; and in a case where the target signal is correctly demodulated, acquiring the power intensity, to be received, of the target signal correctly demodulated.

In the present application, the wireless communication system may be any wireless communication system that the terminal may access, for example, a 2G wireless communication system, a 3G wireless communication system, a 4G wireless communication system, a 5G wireless communication system, a future wireless communication system, and the like.

In the present application, the target frequency band refers to a communication frequency band, that may be occupied by the target signal, in communication frequency bands of wireless communication systems, target frequency bands corresponding to different wireless communication systems are different, and each wireless communication system may correspond to one, or two or more target frequency bands.

In a case where any wireless communication system includes two or more target frequency bands, all the target bands are expected to be traversed to determine the target band in which the target signal can be correctly demodulated.

In the present application, each wireless communication system may correspond to one, or two or more downlink synchronization signals. In a case where any wireless communication system includes two or more downlink synchronous signals, all the downlink synchronous signals are expected to be traversed to determine the downlink synchronization signal sent by the wireless communication system.

In the present application, the target signal being the signal to be demodulated by the terminal to access the wireless communication system refers to that, the terminal correctly demodulating the target signal is a precondition that the terminal successfully accesses the wireless communication system, i.e., the terminal can successfully access the wireless communication system when the terminal correctly demodulates the target signal.

In the present application, target signals corresponding to different wireless communication systems may be the same or different. For example, the target signals corresponding to the 4G wireless communication system and the 5G wireless communication system are MIB signals.

In some implementations, for the case where the target area is in the cabin of the aircraft, the wireless communication system may receive wireless signals within the target frequency band through a first antenna disposed in the cabin of the aircraft or a first antenna disposed outside the cabin of the aircraft.

In some implementations, the method for sending the interference signal further includes: in a case where the target signal is correctly demodulated, acquiring a frequency domain location occupied by the target signal correctly demodulated.

In some implementations, the method for sending the interference signal further includes: in a case where the target signal is correctly demodulated, acquiring a time domain location occupied by the target signal correctly demodulated.

The power intensity, to be received, in the present application may refer to a power intensity, to be received, in a unit spectrum.

The unit spectrum is not limited in the present application, and for example, the unit spectrum may refer to Hz, resource element (RE), or the like.

At operation 101, determining a parameter for sending the interference signal according to the power intensity, to be received, of the target signal correctly demodulated.

In some implementations, the determining a parameter for sending the interference signal according to the power intensity, to be received, of the target signal correctly demodulated includes: determining the parameter for sending the interference signal according to the power intensity, to be received, of the target signal correctly demodulated and the frequency domain location occupied by the target signal correctly demodulated.

In some implementations, the determining the parameter for sending the interference signal according to the power intensity, to be received, of the target signal correctly demodulated and the frequency domain location occupied by the target signal correctly demodulated includes: determining the parameter for sending the interference signal according to the power intensity, to be received, of the target signal correctly demodulated, the frequency domain location and the time domain location occupied by the target signal correctly demodulated.

In some implementations, the parameter for sending the interference signal includes a power of the interference signal to be sent and at least one of followings: a frequency domain bandwidth, the number of interference signals, a frequency domain location, or a time domain location.

In some implementations, the power of the interference signal to be sent, the frequency domain bandwidth of the interference signal, and the number of the interference signals are determined according to the power intensity, to be received, of the target signal correctly demodulated.

In some implementations, the determining a parameter for sending the interference signal according to the power intensity, to be received, of the target signal correctly demodulated includes: determining the power of the interference signal to be sent, the frequency domain bandwidth of the interference signal, and the number of the interference signals according to the power intensity, to be received, of the target signal correctly demodulated under a constraint of a constraint condition, the constraint condition being that a difference between a minimum signal-to-noise ratio of the target signal, that is to be correctly demodulated by the terminal in the target area, and a signal-to-noise ratio of the target signal to be actually received is greater than or equal to a preset threshold, the signal-to-noise ratio of the target signal to be actually received being calculated according to the power intensity, to be received, of the target signal correctly demodulated.

In some implementations, for the case where the target area is in the cabin of the aircraft, the signal-to-noise ratio of the target signal to be actually received is a difference between the power intensity, to be received, of the target signal correctly demodulated and the power of the interference signal to be sent, for example, in a case where the first antenna is disposed in the cabin of the aircraft, since the power intensity, to be received, of the target signal, which is measured by the first antenna is equal to the power intensity of the target signal to be received by the terminal in the cabin of the aircraft, an effect of a maximum penetration loss of wireless signals sent from an outside of the cabin of the aircraft to an interior of the cabin of the aircraft is not to be considered; or, the signal-to-noise ratio of the target signal to be actually received is a difference between the power intensity, to be received, of the target signal correctly demodulated, and the power of the interference signal to be sent together with a maximum penetration loss of wireless signals sent from the outside of the cabin of the aircraft to the interior of the cabin of the aircraft, for example, in a case where the first antenna is disposed outside the cabin of the aircraft, since the power intensity, to be received, of the target signal, which is measured by the first antenna is not equal to the power intensity of the target signal to be received by the terminal in the cabin of the aircraft, the effect of the maximum penetration loss of wireless signals sent from the outside of the cabin of the aircraft to the interior of the cabin of the aircraft is to be considered.

In some implementations, for the case where the target area is in the cabin of the aircraft, the signal-to-noise ratio of the target signal to be actually received may be expressed as $$\eta - \left[\sum_{i=1}^{N} P_i \times W_i - 10\log_{10}(B)\right] - \lambda \times PL,$$

then, the constraint condition may be expressed by a formula:

$$SNR_{min} - \left\{\eta - \left[\sum_{i=1}^{N} P_i \times W_i - 10\log_{10}(B)\right] - \lambda \times PL\right\} \geq X.$$

$SNR^{min}$ is a minimum signal-to-noise ratio, with a unit of dB, of the target signal that is to be correctly demodulated by the terminal, η is the power intensity, to be received, of the target signal correctly demodulated, which has a unit of dBm/Hz, N is the number of the interference signals, $P_i$ is a power per hertz, with a unit of dBm/Hz, of an i-th interference signal to be sent, $W_i$ is a frequency domain bandwidth, with a unit of Hz, of the i-th interference signal to be sent, B is the frequency domain bandwidth, with a unit of Hz, occupied by the target signal correctly demodulated in the wireless communication system, λ is equal to 0, or 1, and a specific value of λ is related to a position of the first antenna, for example, λ is equal to 1 in the case where the first antenna is disposed outside the cabin of the aircraft, λ is equal to 0 in the case where the first antenna is disposed in the cabin of the aircraft, PL is the maximum penetration loss, with a unit of dB, of wireless signals sent from the outside of the cabin of the aircraft to the interior of the cabin of the aircraft, and X is the preset threshold with a unit of dBm.

In the present application, the interference signal sent on each subcarrier is regarded as one interference signal.

In some implementations, a sum of frequency domain bandwidths of N interference signals is the frequency domain bandwidth of the target signal correctly demodulated.

The power and the frequency domain bandwidth of each interference signal to be sent, and the number of interference signals can be obtained through the above formula.

In some implementations, the frequency domain location of the interference signal is determined according to the frequency domain location occupied by the target signal correctly demodulated.

In some implementations, the frequency domain location of the interference signal includes: a part or all of frequency domain locations occupied by the target signal correctly demodulated.

In some implementations, the time domain location of the interference signal may be determined according to the time domain location occupied by the target signal correctly demodulated, or may also be determined to be all time domain locations of the wireless communication system.

In some implementations, the time domain location of the interference signal includes: the time domain location occupied by the target signal correctly demodulated; or all time domain locations of the wireless communication system; or the time domain location occupied by the target signal correctly demodulated, and a time domain location calculated according to the time domain location occupied by the target signal correctly demodulated and a period for sending the target signal.

A specific form of the interference signal is not limited in the present application, and for example, the interference signal may be a fixed sequence or a randomly generated sequence.

The content of the interference signal to be sent is not limited in the present application, and may be, for example, a square wave or a narrow-band pulse.

At operation 102, sending the interference signal based on the parameter for sending the interference signal, so that the terminal in a target area is unable to correctly demodulate the target signal.

In some implementations, the target area is an area where the terminal is not allowed to access the wireless communication system in a particular scene. For example, the target area is in the cabin of the aircraft, and the terminal in the cabin of the aircraft is not allowed to access the wireless communication system on the ground during the aircraft taking off and landing.

In some implementations, the sending the interference signal based on the parameter for sending the interference signal includes: sending the interference signal through a second antenna disposed in the cabin of the aircraft based on the parameter for sending the interference signal.

In the present application, since a purpose of sending the interference signal is to have an effect on the terminal, in the cabin of the aircraft, receiving the target signal, the second antenna for sending the interference signal may be disposed in the cabin of the aircraft to reduce the power of the interference signal to be sent and save resources.

In the present application, in a case where the first antenna is disposed in the cabin of the aircraft, both the first antenna and the second antenna may be implemented by a same antenna, that is, the first antenna and the second antenna may be common to each other.

In some implementations, the sending the interference signal based on the parameter for sending the interference signal includes: sending a corresponding number of interference signals at corresponding time domain locations and corresponding frequency domain locations according to the power of each interference signal to be sent, the frequency domain bandwidth of each interference signal to be sent and the number of interference signals.

According to the method for sending the interference signal in the present application, since the terminal correctly demodulating the target signal is the precondition that the terminal successfully accesses the wireless communication system, the interference signal is sent to prevent the terminal in the target area from correctly demodulating the target signal, so that the terminal in the target area cannot successfully access the wireless communication system, thereby avoiding serious consequences or great hidden safety hazards caused by the terminal accessing the wireless communication system.

Following two examples are illustrated for explaining in detail specific implementation procedures of the method for sending the interference signal according to the present application, and the examples are merely for conveniently illustrating and are not intended to limit the protection scope of the present application.

Example 1

In a certain scene, the wireless communication system on the ground is a standard Frequency Division Duplexing (FDD) Long Term Evolution (LTE) wireless communication system based on the 3rd Generation Partnership Project (3GPP), an uplink operation frequency band of the wireless communication system is from 1755 MHz to 1785 MHz, a downlink operation frequency band of the wireless communication system is from 1850 MHz to 1880 MHz, but the downlink operation frequency band of a certain FDD LTE wireless communication system may be divided into two sections including a section from 1850 MHz to 1860 MHz and a section from 1860 MHz to 1880 MHz.

Figure 2:
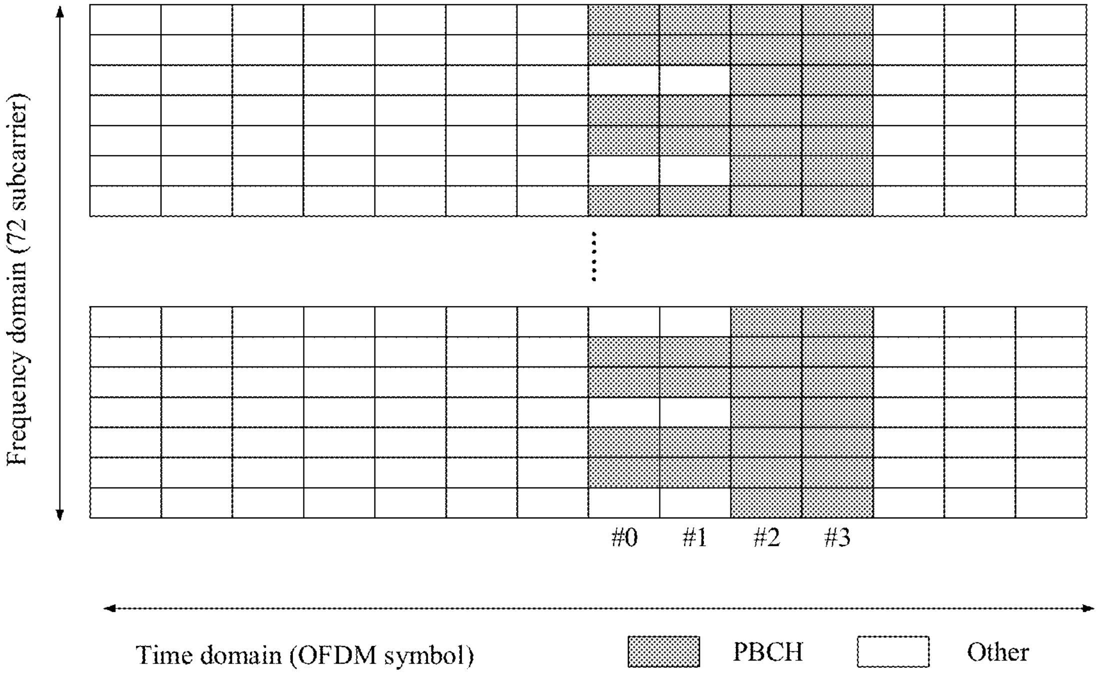
FIG. 2 is a schematic diagram of a time domain location and a frequency domain location of a Master Information Block (MIB) signal in an example 1 of the present application.

FIG. 2 is a schematic diagram of a time domain location and a frequency domain location of an MIB signal in the example 1 of the present application. As shown in FIG. 2, the downlink of the LTE wireless communication system adopts a manner of four Cell-specific Reference Signal (CRS) ports, a downlink synchronization channel of the LTE wireless communication system includes: a Primary Synchronization Channel (P-SCH) and a Secondary Synchronization Channel (S-SCH), the MIB signal is carried by a Physical Broadcast Channel (PBCH) to be transmitted, as shown in FIG. 2, according to a stipulation of protocol, the PBCH occupies 72 subcarriers (i.e., 72 REs) at a central frequency point of the downlink operation frequency band of the LTE wireless communication system in a frequency domain, and a length of a frequency band occupied by the PBCH is (72×15 kHz)=1080 kHz, which is evenly distributed on both sides of the central frequency point of the FDD LTE wireless communication system, and is specifically in a frequency band from 1869.46 MHz to 1870.54 MHz.

A wireless signal within a target frequency band, from 1860 MHz to 1880 MHz, of the FDD LTE wireless communication system is received through the first antenna disposed outside the cabin of the aircraft: a correlation between the wireless signal and the downlink synchronization signal is calculated; time synchronization information and frequency synchronization information are determined according to the wireless signal with the maximum correlation: the MIB signal carried by the PBCH is demodulated according to the time synchronization information and the frequency synchronization information: assuming that a result of Cyclic Redundancy Check (CRC) for demodulating the PBCH in the frequency band from 1869.46 MHz to 1870.54 MHz is correct, it indicates that the MIB signal can be correctly demodulated in the frequency band, and it can be known that a bandwidth of the FDD LTE wireless communication system is 20 MHz, and the power intensity per hertz, to be received, of the MIB signal correctly demodulated is −126 dBm.

Figure 3:
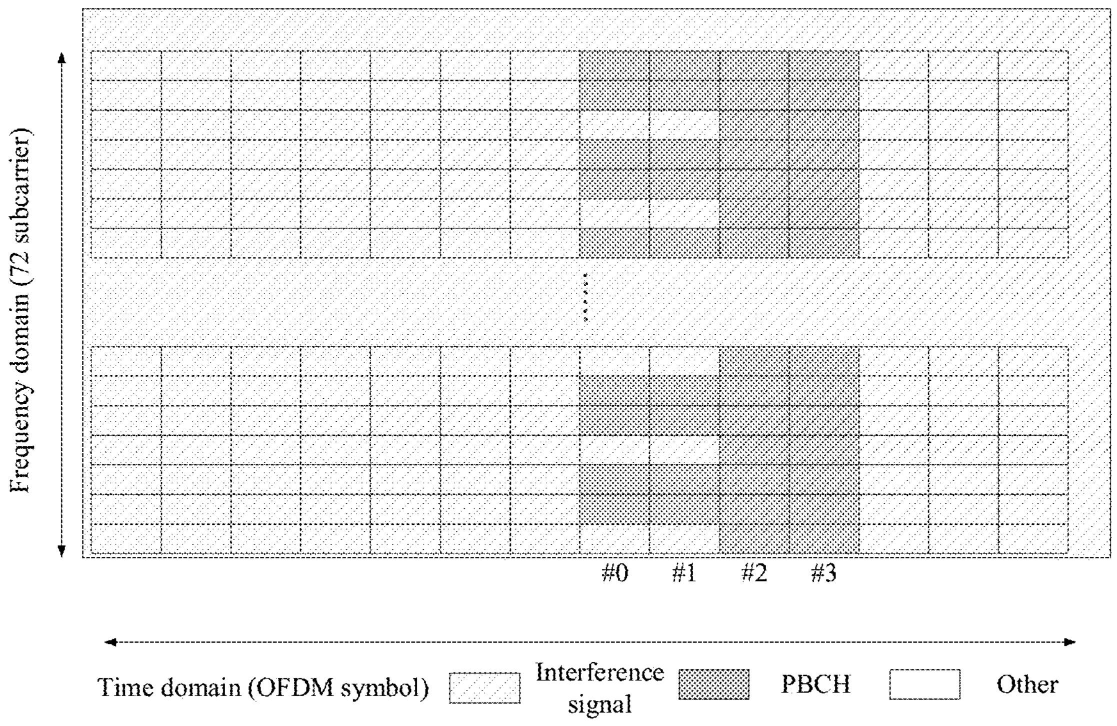
FIG. 3 is a schematic diagram of a time domain location and a frequency domain location of an interference signal in the example 1 of the present application.

FIG. 3 is a schematic diagram of a time domain location and a frequency domain location of an interference signal in the example 1 of the present application. As shown in FIG. 3, assuming that a minimum SNR, to be received, for correctly demodulating the PBCH by the terminal is set to −5 dB, the first antenna in the example is disposed outside the cabin of the aircraft, then, PL is equal to 20 dB, λ is equal to 1, a frequency band of the interference signal is set to be an entire bandwidth of 1.08 MHz, and the preset threshold is equal to 3 dBm.

A power, at a unit frequency, of the interference signal to be sent can be calculated according to the following formula:

$$(-5)-\left\{(-126)-\left[\sum_{i=1}^{72}P_i*15*10^3-10*\log_{10}(1.08*10^6)\right]-20\right\}\geq 3\ (\text{dBm}),$$

$P_i$ is a power per hertz of an i-th interference signal to be sent, in the example, each RE corresponds to one interference signal, and powers of the interference signals corresponding to all REs are equal.

The power, at the unit frequency, of the interference signal calculated according to the above formula is expected to be greater than or equal to −138 dBm/Hz, and the power of the interference signal corresponding to each RE is expected to be greater than −97 dBm.

Figure 4:
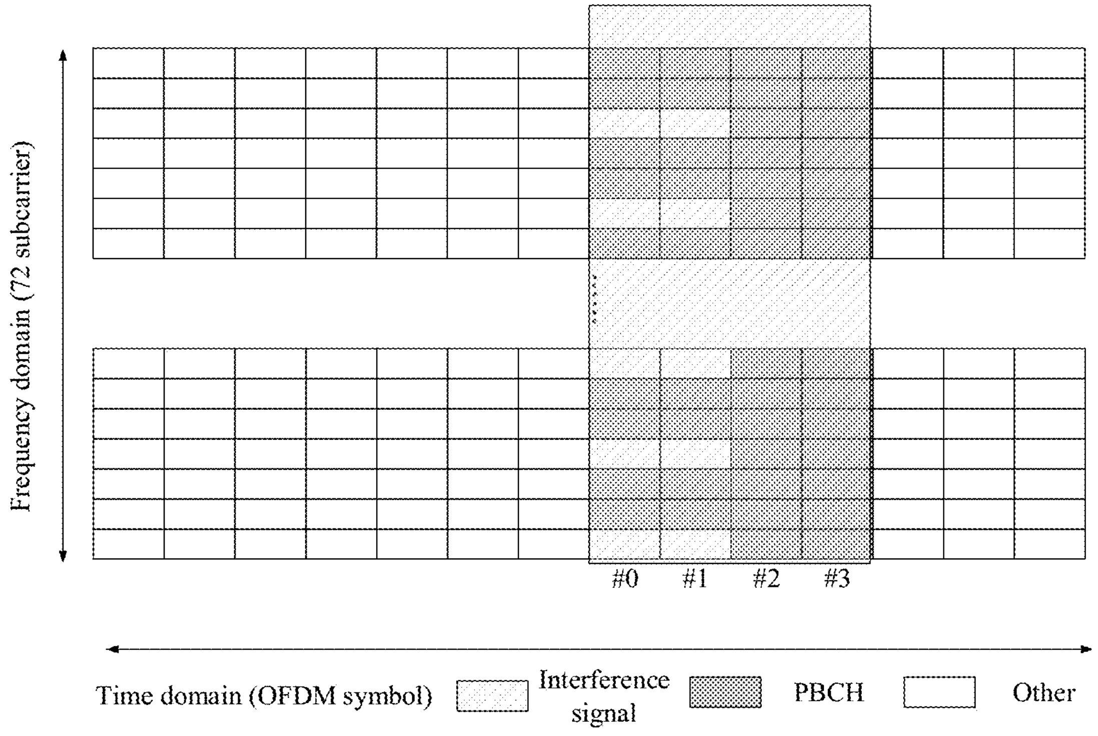
FIG. 4 is a schematic diagram of a time domain location and a frequency domain location of an interference signal in the example 1 of the present application.

The time domain location at which the interference signal is to be sent may be selected to be over the entire time domain, as shown in FIG. 3. In addition, the time domain location at which the interference signal is to be sent may also be selected to be only within a time period of sending the PBCH, as shown in FIG. 4, a specific time period of sending the PBCH may be obtained from the MIB signals, the time period of sending the PBCH in the example is 10 ms, a time length occupied by sending the interference signal in each time period is four Orthogonal Frequency Division Multiplexing (OFDM) symbols, and is about (4/14) =0.286 ms.

In the example, after the interference signal is sent in any of the above sending manners, the terminal in the cabin of the aircraft cannot access the FDD LTE wireless communication system on the ground, thereby avoiding interference, on the airborne device such as an altimeter in the aircraft, caused by the terminal accessing the FDD LTE wireless communication system on the ground.

Example 2

Figure 5:
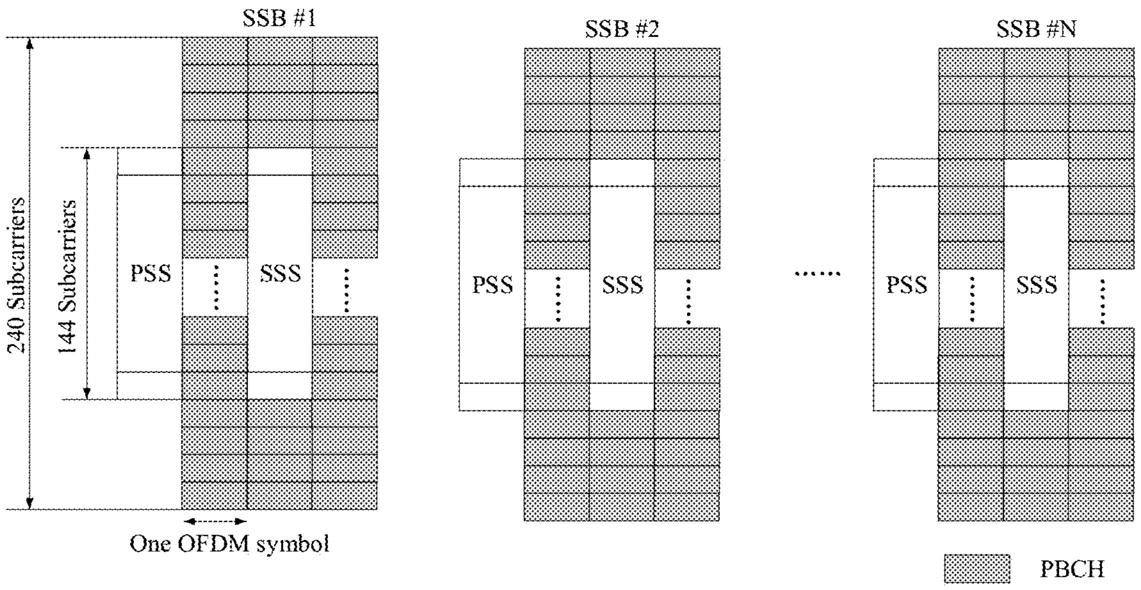
FIG. 5 is a schematic diagram of a time domain location and a frequency domain location of an MIB signal in an example 2 of the present application.

In a certain scene, the wireless communication system on the ground is a standard Time Division Duplexing (TDD) New Radio (NR) wireless communication system based on the 3GPP, the downlink operation frequency band of the wireless communication system is from 4800 MHZ to 4900 MHZ, FIG. 5 is a schematic diagram of a time domain location and a frequency domain location of an MIB signal in the example 2 of the present application, as shown in FIG. 5, the downlink synchronization signal of the NR wireless communication system includes a Primary Synchronization Signal (PSS) and a Secondary Synchronization Signal (SSS), the MIB signal is carried by the PBCH to be transmitted, three parts including the PSS, the SSS, and the PBCH form a Synchronization Signal and PBCH block (SSB). As shown in FIG. 5, according to a stipulation of protocol, a frequency domain of the SSB is mapped on 240 subcarriers in the downlink operation band of the NR wireless communication system, and a length of a frequency band occupied by the PBCH is (240×30 kHz)=7200 kHz, which is specifically in a frequency band from 4800 MHZ to 4807.2 MHZ. A wireless signal within a target frequency band, from 4800 MHZ to 4900 MHZ, of the TDD NR wireless communication system are received by the first antenna disposed in the cabin of the aircraft: a correlation between the wireless signal and the downlink synchronization signal is calculated; time synchronization information and frequency synchronization information are determined according to the wireless signal with the maximum correlation: the MIB signal carried by the PBCH is demodulated according to the time synchronization information and the frequency synchronization information; assuming that a result of CRC for demodulating the PBCH in the frequency band from 4800 MHZ to 4900 MHz is correct, it indicates that the MIB signal can be correctly demodulated in the frequency band, and it can be known that a bandwidth of the TDD NR wireless communication system is 100 MHz, and the power intensity per hertz, to be received, of the MIB signal correctly demodulated is −145 dBm.

Figure 6:
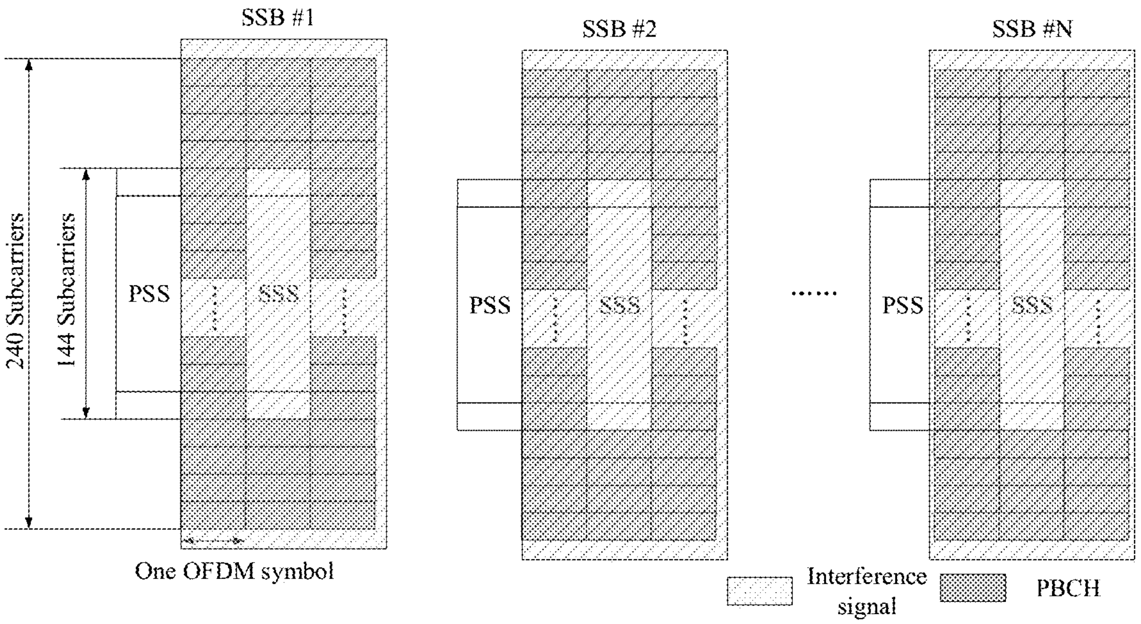
FIG. 6 is a schematic diagram of a time domain location and a frequency domain location of an interference signal in the example 2 of the present application.

FIG. 6 is a schematic diagram of a time domain location and a frequency domain location of an interference signal in the example 2 of the present application. As shown in FIG. 6, assuming that a minimum SNR, to be received, for correctly demodulating the PBCH by the terminal is set to −6 dB, the first antenna in the example is disposed in the cabin of the aircraft, then λ is equal to 1, PL is equal to 20 dB, a frequency band of the interference signal is set to be an entire bandwidth of 7.2 MHz, and the preset threshold is equal to 5 dBm.

A power, at a unit frequency, of the interference signal to be sent can be calculated according to the following formula:

$$(-6)-\left\{(-145)-\left[\sum_{i=1}^{240} P_i * 30 * 10^3 - 10 * \log_{10}\left(7.2 * 10^6\right)\right]\right\} \geq 5\ (\text{dBm}),$$

$P_i$ is a power per hertz of an i-th interference signal to be sent, in the example, each RE corresponds to one interference signal, and powers of the interference signals corresponding to all REs are equal.

The power, at the unit frequency, of the interference signal calculated according to the above formula is expected to be greater than or equal to −134 dBm/Hz, and the power of the interference signal corresponding to each RE is expected to be greater than −89 dBm.

The time domain location at which the interference signal is to be sent may be selected to be only within a time period of sending the SSB, as shown in FIG. 6, a specific time period of sending the SSB may be obtained from the MIB signals, each SSB group includes eight SSBs, the time period of sending the SSB in the example is 20 ms, a time length occupied by sending the interference signal in the time period of each SSB is three OFDM symbols, and is about (3/28)=0.107 ms.

In the example, after the interference signal is sent in any of the above sending manners, the terminal in the cabin of the aircraft cannot access the TDD NR wireless communication system on the ground, thereby avoiding interference, on the airborne device such as an altimeter in the aircraft, caused by the terminal accessing the TDD NR wireless communication system on the ground.

In a second aspect, the present application provides an electronic device, including: at least one processor; and a memory having at least one computer program stored thereon, the at least one computer program, executed by the at least one processor, causes the at least one processor to implement the method for sending the interference signal described above.

The processor is a device having a capability of processing data, includes, but is not limited to, a Central Processing Unit (CPU), and the like: the memory is a device having a capability of storing data, includes, but is not limited to, a random access memory (RAM, in particular, SDRAM, DDR, and the like), a read only memory (ROM), an electrically erasable programmable read only memory (EEPROM), and a FLASH.

In some implementations, the processor, and the memory are connected together through a bus, and are further connected to other components of a computing device.

In a third aspect, the present application provides a computer-readable storage medium having a computer program stored thereon, the computer program, executed by a processor, causes the processor to implement the method for sending the interference signal described above.

Figure 7:
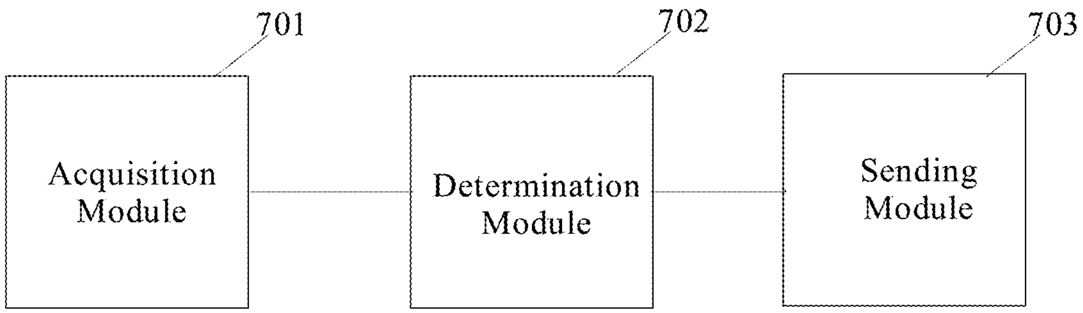
FIG. 7 is a block diagram of an apparatus for sending an interference signal in the present application.

FIG. 7 is a block diagram of an apparatus for sending an interference signal in the present application.

In a fourth aspect, referring to FIG. 7, the present application provides an apparatus for sending an interference signal, including an acquisition module 701, a determination module 702, and a sending module 703.

The acquisition module 701 is configured to acquire a power intensity, to be received, of a target signal correctly demodulated in a wireless communication system, the target signal being a signal to be demodulated by a terminal to access the wireless communication system.

The determination module 702 is configured to determine a parameter for sending the interference signal according to the power intensity, to be received, of the target signal correctly demodulated.

The sending module 703 is configured to send the interference signal based on the parameter for sending the interference signal, so that the terminal in a target area is unable to correctly demodulate the target signal.

In some implementations, the acquisition module 701 is further configured to acquire a frequency domain location occupied by the target signal correctly demodulated; and the determination module 702 is configured to determine the parameter for sending the interference signal according to the power intensity, to be received, of the target signal correctly demodulated and the frequency domain location occupied by the target signal correctly demodulated.

In some implementations, the acquisition module 701 is further configured to acquire a time domain location occupied by the target signal correctly demodulated; and the determination module 702 is configured to determine the parameter for sending the interference signal according to the power intensity, to be received, of the target signal correctly demodulated, the frequency domain location and the time domain location occupied by the target signal correctly demodulated.

In some implementations, the parameter for sending the interference signal includes a power of the interference signal to be sent and at least one of followings: a frequency domain bandwidth, the number of interference signals, a frequency domain location, or a time domain location.

In some implementations, the determination module 702 is configured to determine the power of the interference signal to be sent, the frequency domain bandwidth of the interference signal, and the number of interference signals according to the power intensity, to be received, of the target signal correctly demodulated under a constraint of a constraint condition: the constraint condition is that a difference between a minimum signal-to-noise ratio of the target signal that is to be correctly demodulated by the terminal in the target area and a signal-to-noise ratio of the target signal to be actually received is greater than or equal to a preset threshold, the signal-to-noise ratio of the target signal to be actually received is calculated according to the power intensity, to be received, of the target signal correctly demodulated.

In some implementations, the frequency domain location of the interference signal includes: a part or all of frequency domain locations occupied by the target signal correctly demodulated.

In some implementations, the time domain location of the interference signal includes: the time domain location occupied by the target signal correctly demodulated: or all time domain locations of the wireless communication system; or the time domain location occupied by the target signal correctly demodulated, and a time domain location calculated according to the time domain location occupied by the target signal correctly demodulated and a period of sending the target signal.

In some implementations, the interference signal is a fixed sequence or a randomly generated sequence.

In some implementations, the target area is in the cabin of the aircraft.

In some implementations, the sending module 703 is configured to send the interference signal through a second antenna disposed in the cabin of the aircraft based on the parameter for sending the interference signal.

A procedure for implementing the apparatus for sending the interference signal described above is the same as that for implementing the method for sending the interference signal described above, and thus is not repeated herein.

It should be understood by those of ordinary skill in the art that all or some of the operations in the method, the functional modules/components in the apparatuses disclosed above may be implemented as software, firmware, hardware, or suitable combinations thereof. In a hardware implementation, the division between the functional modules/components stated above does not correspond to the division of physical components: for example, one physical component may have a plurality of functions, or one function or operation may be performed through a cooperation of several physical components. A part or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium implemented in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present application discloses the exemplary implementations, and although specific terms are employed, they are used and should only be interpreted in a generic and descriptive meaning but not for purposes of a limitation. It is apparent to those skilled in the art that features, characteristics and/or elements described in connection with specific implementations may be used alone or in combination with features, characteristics and/or elements described in connection with other implementations, unless explicitly stated otherwise. Therefore, it should be understood by those skilled in the art that various changes in form and details may be made without departing from the scope of the present application as set forth in the appended claims.

What is claimed is:

1. A method for sending an interference signal, comprising:

acquiring a power intensity, to be received, of a target signal correctly demodulated in a wireless communication system, the target signal being a signal to be demodulated by a terminal to access the wireless communication system;

determining a parameter for sending the interference signal according to the power intensity, to be received, of the target signal correctly demodulated; and sending the interference signal based on the parameter for sending the interference signal, so that the terminal in a target area is unable to correctly demodulate the target signal, wherein the parameter of the interference signal to be sent comprises a power of the interference signal to be sent and at least one of followings: a frequency domain bandwidth, a total number of interference signals, a frequency domain location, or a time domain location, wherein the determining a parameter for sending the interference signal according to the power intensity, to be received, of the target signal correctly demodulated comprises:

determining the power of the interference signal to be sent, the frequency domain bandwidth of the interference signal, and the number of interference signals according to the power intensity, to be received, of the target signal correctly demodulated under a constraint of a constraint condition, wherein the constraint condition is that a difference between a minimum signal-to-noise ratio of the target signal that is to be correctly demodulated by the terminal in the target area and a signal-to-noise ratio of the target signal to be actually received is greater than or equal to a preset threshold, and the signal-to-noise ratio of the target signal to be actually received is calculated according to the power intensity, to be received, of the target signal correctly demodulated.

2. The method of claim 1, further comprising:

before the determining a parameter for sending the interference signal according to the power intensity, to be received, of the target signal correctly demodulated, acquiring a frequency domain location occupied by the target signal correctly demodulated;

wherein the determining a parameter for sending the interference signal according to the power intensity, to be received, of the target signal correctly demodulated comprises:

determining the parameter for sending the interference signal according to the power intensity, to be received, of the target signal correctly demodulated and the frequency domain location occupied by the target signal correctly demodulated.

3. The method of claim 2, further comprising:

before the determining the parameter for sending the interference signal according to the power intensity, to be received, of the target signal correctly demodulated and the frequency domain location occupied by the target signal correctly demodulated, acquiring a time domain location occupied by the target signal correctly demodulated;

wherein the determining the parameter for sending the interference signal according to the power intensity, to be received, of the target signal correctly demodulated and the frequency domain location occupied by the target signal correctly demodulated comprises:

determining the parameter for sending the interference signal according to the power intensity, to be received, of the target signal correctly demodulated, the frequency domain location and the time domain location occupied by the target signal correctly demodulated.

4. The method of claim 1, wherein the frequency domain location of the interference signal comprises: a part or all of frequency domain locations occupied by the target signal correctly demodulated.

5. The method of claim 1, wherein the time domain location of the interference signal comprises:

the time domain location occupied by the target signal correctly demodulated; or all time domain locations of the wireless communication system; or the time domain location occupied by the target signal correctly demodulated, and a time domain location calculated according to the time domain location occupied by the target signal correctly demodulated and a period of sending the target signal.

6. The method of claim 1, wherein the interference signal is a fixed sequence or a randomly generated sequence.

7. The method of claim 1, wherein the target area is in a cabin of an aircraft.

8. The method of claim 7, wherein the sending the interference signal based on the parameter for sending the interference signal comprises:

sending the interference signal through a second antenna disposed in the cabin of the aircraft based on the parameter for sending the interference signal.

9. An electronic device, comprising:

at least one processor; and a memory having at least one computer program stored thereon, the at least one computer program, executed by the at least one processor, causes the at least one processor to implement the method of claim 1.

10. A non-transitory computer-readable storage medium having a computer program stored thereon, the computer program, executed by a processor, causes the processor to implement the method of claim 1.

11. An apparatus for sending an interference signal, comprising:

an acquisition module configured to acquire a power intensity, to be received, of a target signal correctly demodulated in a wireless communication system, the target signal being a signal to be demodulated by a terminal to access the wireless communication system;

a determination module configured to determine a parameter for sending the interference signal according to the power intensity, to be received, of the target signal correctly demodulated; and a sending module configured to send the interference signal based on the parameter for sending the interference signal, so that the terminal in a target area is unable to correctly demodulate the target signal, wherein the parameter of the interference signal to be sent comprises a power of the interference signal to be sent and at least one of followings: a frequency domain bandwidth, a total number of interference signals, a frequency domain location, or a time domain location, the determination module is configured to determine the power of the interference signal to be sent, the frequency domain bandwidth of the interference signal, and the number of interference signals according to the power intensity, to be received, of the target signal correctly demodulated under a constraint of a constraint condition, wherein the constraint condition is that a difference between a minimum signal-to-noise ratio of the target signal that is to be correctly demodulated by the terminal in the target area and a signal-to-noise ratio of the target signal to be actually received is greater than or equal to a preset threshold, and the signal-to-noise ratio of the target signal to be actually received is calculated according to the power intensity, to be received, of the target signal correctly demodulated.

12. A method for sending an interference signal, comprising:

acquiring a power intensity, to be received, of a target signal correctly demodulated in a wireless communication system, the target signal being a signal to be demodulated by a terminal to access the wireless communication system;

acquiring a frequency domain location occupied by the target signal correctly demodulated;

acquiring a time domain location occupied by the target signal correctly demodulated;

determining a parameter for sending the interference signal according to the power intensity, to be received, of the target signal correctly demodulated, the frequency domain location and the time domain location occupied by the target signal correctly demodulated; and sending the interference signal based on the parameter for sending the interference signal, so that the terminal in a target area is unable to correctly demodulate the target signal.

* * * * *